(12) United States Patent
Zhou et al.

(10) Patent No.: US 8,787,491 B2
(45) Date of Patent: Jul. 22, 2014

(54) METHOD AND APPARATUS FOR GENERATING REFERENCE SIGNAL

(71) Applicant: Huawei Technologies Co., Ltd., Guangdong (CN)

(72) Inventors: Mingyu Zhou, Shenzhen (CN); Yuan Xia, Shenzhen (CN); Qiang Li, Shenzhen (CN); Zuomin Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/633,630

(22) Filed: Oct. 2, 2012

(65) Prior Publication Data
US 2013/0022082 A1    Jan. 24, 2013

Related U.S. Application Data (63) Continuation of application No. PCT/CN2011/072308, filed on Mar. 30, 2011.

(30) Foreign Application Priority Data

Apr. 2, 2010 (CN) .......................... 2010 1 0139807

(51) Int. Cl.
H04L 27/00 (2006.01)
(52) U.S. Cl.
USPC ........... 375/295; 375/346; 375/284; 375/149; 375/130
(58) Field of Classification Search
USPC ....................................................... 375/295
See application file for complete search history.

(56) References Cited

U.S. PATENT DOCUMENTS

| 6,542,478 B1* | 4/2003 | Park .............................. 370/308 |
| 2008/0095040 A1* | 4/2008 | Kwon et al. .................. 370/210 |
| 2009/0046645 A1 | 2/2009 | Bertrand et al. |
| 2009/0245198 A1* | 10/2009 | Tiirola et al. ................. 370/330 |
| 2012/0263136 A1 | 10/2012 | Higuchi |

FOREIGN PATENT DOCUMENTS

| CN | 1262824 A | 8/2000 |
| CN | 101335550 A | 12/2008 |
| CN | 101682876 A | 3/2010 |
| WO | WO 2009023692 A2 | 2/2009 |
| WO | WO 2009039224 A1 | 3/2009 |

OTHER PUBLICATIONS

"R1-094651—Performance of uplink MU-MIMO with enhanced demodulation reference signal structure," 3GPP TSG RAN WG1 Meeting #59,. Nov. 9-13, 2009, 3GPP, Valbonne France.

(Continued)

Primary Examiner — Lihong Yu
(74) Attorney, Agent, or Firm — Leydig, Voit & Mayer, Ltd.

(57) ABSTRACT

The disclosure discloses a method for generating a reference signal. The method includes: a user equipment receiving a first signaling carrying reference signal solution information sent by a base station, wherein the reference signal solution information has at least one mapping relation with at least one piece of orthogonal code configuration information and at least one hopping mode, and the at least one mapping relation is stored in the base station and the user equipment; determining a corresponding piece of orthogonal code configuration information and a corresponding hopping mode according to the received reference signal solution information and the stored at least one mapping relation; and generating a reference signal according to the determined piece of orthogonal code configuration information and the determined hopping mode.

15 Claims, 7 Drawing Sheets

(56) References Cited

OTHER PUBLICATIONS

"R1-101075—Impacts of OCC on UL DM RS for LTE-A," 3GPP TSG RAN WG1 Meeting #60, 3GPP TSG RAN WG1 Meeting #60, Feb. 22-26, 2010, 3GPP, Valbonne, France.

International Search Report in corresponding International Patent Application No. PCT/CN2011/072308 (Jun. 30, 2011).

Written Opinion of the International Searching Authority in corresponding International Patent Application No. PCT/CN2011/072308 (Jun. 30, 2011).

$1^{st}$ Office Action in corresponding Chinese Patent Application No. 201010139807.5 (Jun. 26, 2013).

"Uplink DM-RS Resource Configuration for LTE-Advanced," 3GPP TSG RAN WG1 Meeting #60, San Francisco, USA, Agenda Item 7.4.1, Document R1-101008, $3^{rd}$ Generation Partnership Project, Valbonne, France (Feb. 22-26, 2010).

* cited by examiner

(A) not using the sequence group hopping technique (B) using the sequence group hopping technique

METHOD AND APPARATUS FOR GENERATING REFERENCE SIGNAL

CROSS REFERENCE TO RELATED APPLICATIONS

This application is a continuation of International Patent Application No. PCT/CN2011/072308, filed on Mar. 30, 2011, which claims priority to Chinese Patent Application No. 201010139807.5, filed on Apr. 2, 2010, both of which are hereby incorporated by reference in their entireties.

FIELD OF INVENTION

The present invention relates to communication technologies, and particularly, to a method and apparatus for generating reference signal.

BACKGROUND OF THE INVENTION

In LTE (Long Term Evolution) system, RS (Reference Signal) is generated by cyclically shifting CAZAC (Const Amplitude Zero Auto-Correlation) sequence. In a specific implementation, a base station may assign a same frequency band and different CSs (Cyclic Shift) to different UEs (User Equipment) so that RSs generated by different UEs are orthogonal. In this way, the base station can distinguish signals sent by the different UEs.

In order to enhance the flexibility of frequency band scheduling, when generating the RSs in the related art, a base station may take the way of assigning partly overlapped frequency bands to the different UEs, while the UEs may adopt hopping technique to benefit from interference randomization. When the base station assigns partly overlapped frequency bands to the different UEs, the hopping mode that the UEs should adopt is different from that when the base station assigns a same frequency band to different UEs. As a result, the base station needs to send not only signalings of the RS to all of the UEs, but also indicated signalings related to hopping to all of the UEs.

The inventor found that there is at least the following problem in the related art during implementation of the present invention.

The hopping mode adopted by a UE in the process of generating the RS need a corresponding indicated signaling sent from a base station to the UE, which increases system signaling overhead.

SUMMARY OF THE INVENTION

Embodiments of the present invention provide a method and an apparatus for generating reference signal. The technical solution is as follows.

In an aspect, a method of generating reference signal is provided, and the method comprises:

receiving, by a user equipment, a first signaling carrying reference signal solution information sent by a base station, wherein the reference signal solution information has at least one mapping relation with at least one piece of orthogonal code configuration information and at least one hopping mode, and the at least one mapping relation is stored in the base station and the user equipment;

determining, by the user equipment, a corresponding piece of orthogonal code configuration information and a corresponding hopping mode according to the received reference signal solution information and the stored at least one mapping relation; and generating, by the user equipment, a reference signal according to the determined piece of orthogonal code configuration information and the determined hopping mode.

In another aspect, a user equipment is provided, and the user equipment comprises:

a storage, configured to store at least one mapping relation among at least one piece of reference signal solution information, at least one piece of orthogonal code configuration information and at least one hopping mode;

a receiver, configured to receive a signaling carrying a piece of reference signal solution information sent by a base station;

a processor, configured to determine, a corresponding piece of orthogonal code configuration information and a corresponding hopping mode according to the received reference signal solution information and the stored at least one mapping relation; and a generator, configured to generate a reference signal according to the determined piece of orthogonal code configuration information and the determined hopping mode.

In an aspect, a method of generating reference signal is further provided, and the method comprises:

storing, by a base station, at least one mapping relation among at least one piece of reference signal solution information, at least one piece of orthogonal code configuration information and at least one hopping mode; and sending, by the base station, a first signaling carrying a piece of reference signal solution information of the at least one piece of reference signal solution information to a user equipment, enabling the user equipment to determine a corresponding piece of orthogonal code configuration information and a corresponding hopping mode according to the reference signal solution information sent by the base station and the at least one mapping relation stored by the user equipment, and generate a reference signal according to the determined piece of orthogonal code configuration information and the determined hopping mode.

In another aspect, a base station is further provided, and the base station comprises:

a storage, configured to store at least one mapping relation among at least one piece of reference signal solution information, at least one piece of orthogonal code configuration information and at least one hopping mode; and a transmitter, configured to send a first signaling carrying a piece of reference signal solution information of the at least one piece of reference signal solution information, to a user equipment, enabling the user equipment to determine a corresponding piece of orthogonal code configuration information and a corresponding hopping mode according to the reference signal solution information sent by the base station and the at least one mapping relation stored by the user equipment, and generate a reference signal according to the determined piece of orthogonal code configuration information and the determined hopping mode.

Advantageous effects of the embodiments of the present invention may be as follows.

Through pre-storing the mapping relation among the reference signal solution information, the orthogonal code configuration information and the hopping mode on the base station and the user equipment and the user equipment generating reference signal after determining the corresponding orthogonal code configuration information and the corresponding hopping mode according to the reference signal solution information sent by the base station, the hopping mode may be delivered without increasing system signaling overhead, so that the UE's hopping mode fits the scenario where the UE is, to ensure the orthogonality of reference signals generated by different UEs in various scenarios.

BRIEF DESCRIPTION OF THE DRAWINGS

To illustrate the technical solution of the embodiments of the present invention more clearly, the accompanying drawings which are needed in the description of embodiments are introduced briefly below. Apparently, the accompanying drawings in the description below are merely some of the embodiments of the present invention, based on which other drawings can be obtained by those skilled in the art without any creative effort.

DETAILED DESCRIPTION OF THE INVENTION

To make objectives, technical solutions and advantages of the present invention more clearly, a detailed description of the embodiments of the present invention will be given below in connection with the accompanying drawings.

Embodiment 1

Figure 1:
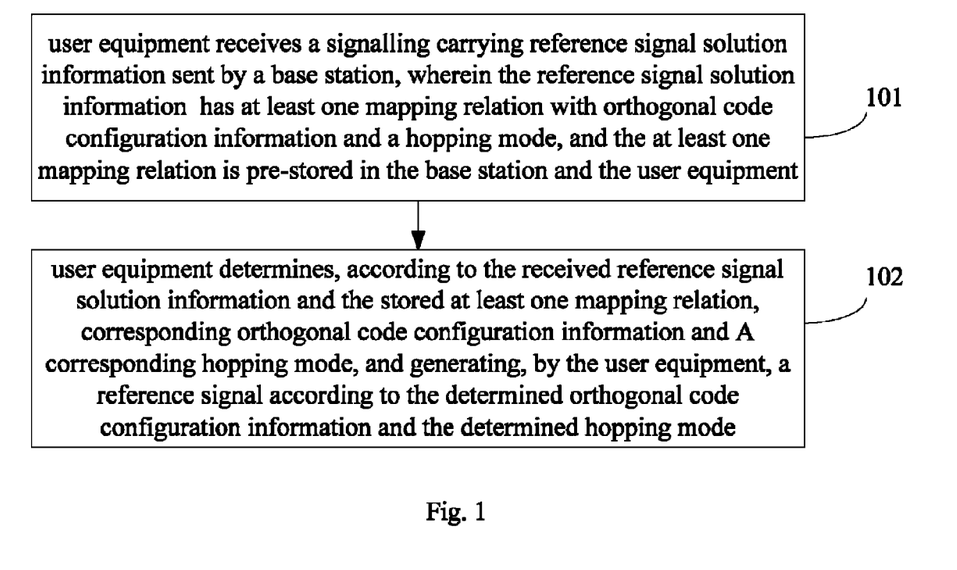
FIG. 1 is a flowchart of a method of generating reference signal provided by embodiment 1 of the present invention.

Referring to FIG. 1, the embodiment provides a method for generating reference signal, and the specific process of the method is as follows:

101: a user equipment receives a signaling carrying reference signal solution information sent by a base station, wherein the reference signal solution information has at least one mapping relation with orthogonal code configuration information and a hopping mode, and the at least one mapping relation is pre-stored in the base station and the user equipment; and

102: the user equipment determines, according to the received reference signal solution information and the stored at least one mapping relation, corresponding orthogonal code configuration information and a corresponding hopping mode, and generating, by the user equipment, a reference signal according to the determined orthogonal code configuration information and the determined hopping mode.

The method provided by the embodiment delivers hopping mode without increasing system signaling overhead, through pre-storing mapping relations among reference signal solution information, orthogonal code configuration information and hopping mode on a base station and a user equipment and the user equipment generating reference signal after determining the corresponding orthogonal code configuration information and the corresponding hopping mode according to the reference signal solution information sent by the base station, so that the UE's hopping mode fits the scenario where the UE is, to ensure the orthogonality of reference signals generated by different UEs in various scenarios.

Embodiment 2

Figure 2:
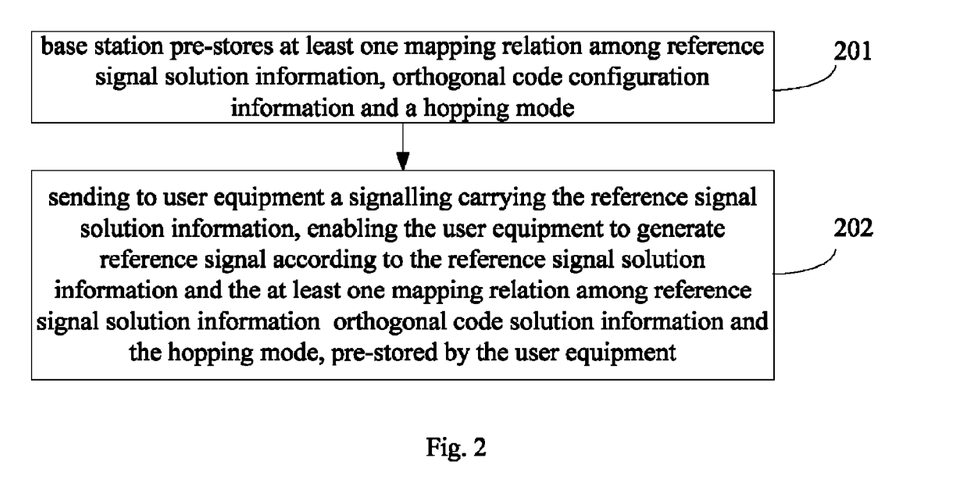
FIG. 2 is a flowchart of a method of generating reference signal provided by embodiment 2 of the present invention.

Referring to FIG. 2, the embodiment provides a method of generating reference signal, and the specific process of the method is as follows.

201: a base station pre-stores at least one mapping relation among reference signal solution information, orthogonal code configuration information and a hopping mode; and

202: a signaling carrying the reference signal solution information is sent to a user equipment, enabling the user equipment to determine corresponding orthogonal code configuration information and a corresponding hopping mode according to the reference signal solution information and the at least one mapping relation among the reference signal solution information, the orthogonal code configuration information and the hopping mode, pre-stored by the user equipment, and generate a reference signal according to the determined orthogonal code configuration information and the determined hopping mode.

The method provided by the embodiment delivers hopping mode without increasing system signaling overhead, through pre-storing mapping relations among reference signal solution information, orthogonal code configuration information and hopping mode on a base station and a user equipment and the user equipment generating reference signal after determining the corresponding orthogonal code configuration information and the corresponding hopping mode according to the reference signal solution information sent by the base station, so that the UE's hopping mode fits the scenario where the UE is, to ensure the orthogonality of reference signals generated by different UEs in various scenarios.

Embodiment 3

Figure 3:
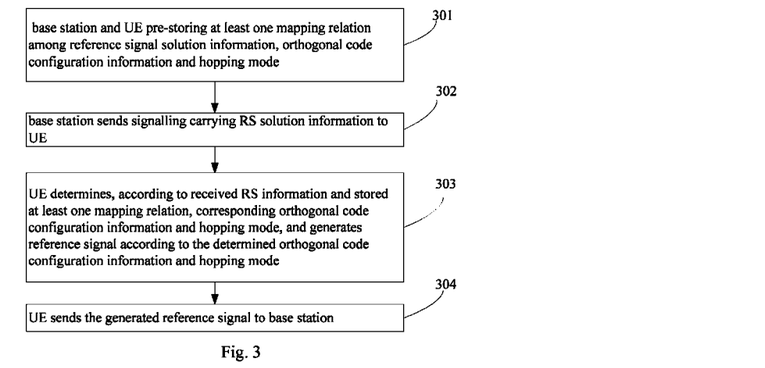
FIG. 3 is a flowchart of a method for generating reference signal provided by embodiment 3 of the present invention.

The embodiment provides a method of generating reference signal, and the method can make a base station send a RS solution information and deliver a corresponding hopping mode information simultaneously, which can not only save system signaling overhead, but also make the UE's hopping mode fits the scenario where the UE is, to ensure the orthogonality of reference signals generated by different UEs in various scenarios. Referring to FIG. 3, the specific process of the method provided by the embodiment is as follows.

301: a base station and a UE pre-stores at least one mapping relation among reference signal solution information, orthogonal code configuration information and a hopping mode;

wherein different RS solution information corresponds to different orthogonal code configuration information and hopping modes. The embodiment does not set limitation on how to store the mapping relations among the RS solution information, the orthogonal code configuration information and the hopping mode. In actual practice, the mapping relations may be stored as a list, as shown in the following Table 1.

TABLE 1

| RS solution information | orthogonal code configuration information | hopping mode |
|---|---|---|
| solution 1 | orthogonal code configuration 1 | hopping mode 1 |
| solution 2 | orthogonal code configuration 2 | hopping mode 2 |
| solution 3 | orthogonal code configuration 3 | hopping mode 3 |
| solution 4 | orthogonal code configuration 4 | hopping mode 4 |
| solution 5 | orthogonal code configuration 5 | hopping mode 5 |
| solution 6 | orthogonal code configuration 6 | hopping mode 6 |
| solution 7 | orthogonal code configuration 7 | hopping mode 7 |
| solution 8 | orthogonal code configuration 8 | hopping mode 8 |

302: the base station sends a signaling carrying the RS solution information to the UE.

As for this step, the embodiment does not set limitation on how the base station sends the signaling carrying the RS solution information. For example, the base station may send the signaling carrying the RS solution information, by a channel for delivering relevant information on uplink scheduling, and send the RS solution information in a coded form, so that the UE may, according to the signaling, obtain the uplink scheduling information and information needed for generating RS. As the mapping relation list shown in Table 1, after encoding the different solutions 1-8 of the RS solution information, the mapping relation list is shown in the following Table 2.

TABLE 2

| RS solution information | orthogonal code configuration information | hopping mode |
|---|---|---|
| 000 | orthogonal code configuration 1 | hopping mode 1 |
| 001 | orthogonal code configuration 2 | hopping mode 2 |
| 010 | orthogonal code configuration 3 | hopping mode 3 |
| 011 | orthogonal code configuration 4 | hopping mode 4 |
| 100 | orthogonal code configuration 5 | hopping mode 5 |
| 101 | orthogonal code configuration 6 | hopping mode 6 |
| 110 | orthogonal code configuration 7 | hopping mode 7 |

TABLE 2-continued

| RS solution information | orthogonal code configuration information | hopping mode |
|---|---|---|
| 111 | orthogonal code configuration 8 | hopping mode 8 |

Furthermore, the embodiment also does not set limitation on the specific RS solution information carried in the signaling. For example, the base station sends a signaling carrying the RS solution information code 001 to the UE. After receiving the signaling, the UE may determine, according to the following steps, the configuration code information and the hopping mode corresponding to the code 001, and thereby generates the RS. Therefore, by merely carrying the RS solution information in the signaling, the base station may make the UE obtain the information of the hopping mode and so on needed for generating the RS, to avoid addition of new signalings, thereby saving system signaling overhead.

303: the UE determines, according to the received reference RS information and the stored at least one mapping relation, corresponding orthogonal code configuration information and a corresponding hopping mode, and generates a reference signal according to the determined orthogonal code configuration information and the determined hopping mode.

Specifically, the reference signal generated by the UE according to the orthogonal code configuration information and the hopping mode is DM RS (Demodulation Reference Signal). The embodiment does not set limitation on the specific way to generate the reference signal, and in actual practice, the way to generate reference signal in the related art may be referred to. The orthogonal code configuration information includes at least one of an orthogonal code, CS and OCC (Orthogonal Cover Code), which is used by the UE in generating the RS.

For example, the orthogonal code configuration information includes an orthogonal code used by the UE in generating the RS, namely, the orthogonal code configurations i (i=1, 2, . . . , 8) in Table 2 represent orthogonal code 1, orthogonal code 2, . . . , orthogonal code 8, respectively, then the mapping relation list is as shown in the following Table 3.

TABLE 3

| RS solution information | orthogonal code configuration information | hopping mode |
|---|---|---|
| 000 | orthogonal code 1 | hopping mode 1 |
| 001 | orthogonal code 2 | hopping mode 2 |
| 010 | orthogonal code 3 | hopping mode 3 |
| 011 | orthogonal code 4 | hopping mode 4 |
| 100 | orthogonal code 5 | hopping mode 5 |
| 101 | orthogonal code 6 | hopping mode 6 |
| 110 | orthogonal code 7 | hopping mode 7 |
| 111 | orthogonal code 8 | hopping mode 8 |

For another example, the orthogonal code configuration information includes CS which is used by the UE in generating the RS, and the orthogonal code configurations i (i=1, 2, . . . , 8) in Table 2 represent CS1, CS2, . . . , CS8, respectively, then the mapping relation list is as shown in the following Table 4.

TABLE 4

| RS solution information | orthogonal code configuration information | hopping mode |
| --- | --- | --- |
| 000 | CS 1 | hopping mode 1 |
| 001 | CS 2 | hopping mode 2 |
| 010 | CS 3 | hopping mode 3 |
| 011 | CS 4 | hopping mode 4 |
| 100 | CS 5 | hopping mode 5 |
| 101 | CS 6 | hopping mode 6 |
| 110 | CS 7 | hopping mode 7 |
| 111 | CS 8 | hopping mode 8 |

For another example, the orthogonal code configuration information includes OCC which is used by the UE in generating the RS, and the orthogonal code configurations i (i=1, 2, . . . , 8) in Table 2 represent OCC1, OCC2, . . . , OCC8, respectively, then the mapping relations are as shown in the following Table 5.

TABLE 5

| RS solution information | orthogonal code configuration information | hopping mode |
| --- | --- | --- |
| 000 | OCC 1 | hopping mode 1 |
| 001 | OCC 2 | hopping mode 2 |
| 010 | OCC 3 | hopping mode 3 |
| 011 | OCC 4 | hopping mode 4 |
| 100 | OCC 5 | hopping mode 5 |
| 101 | OCC 6 | hopping mode 6 |
| 110 | OCC 7 | hopping mode 7 |
| 111 | OCC 8 | hopping mode 8 |

Figure 4:
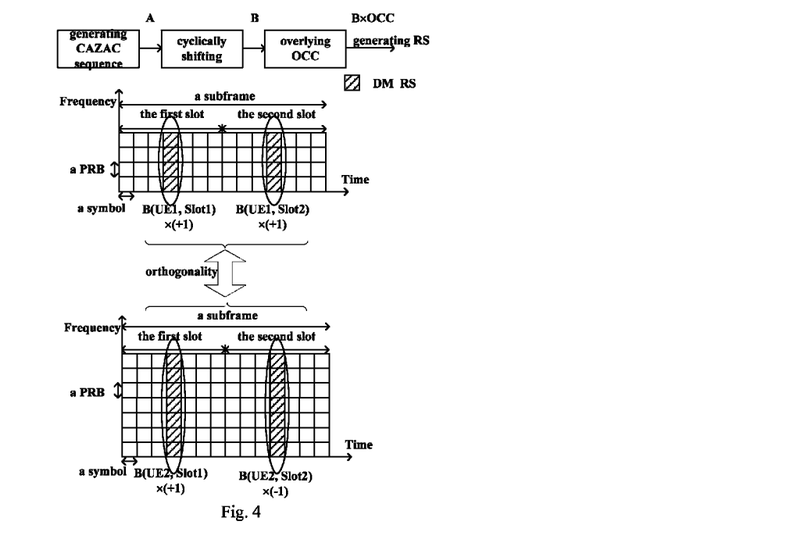
FIG. 4 is a schematic drawing of the principal of generating enhanced reference signal provided by the embodiment 3 of the present invention.

RS can be enhanced with use of OCC to generate the RS, namely adding an additional layer of OCC in time dimension after cyclically shifting the CAZAC sequence. In this way, the base station may assign partly overlapped frequency bands and different OCCs to different UEs to ensure the orthogonality among the RSs generated by different UEs. As the schematic drawing of the principal of generating enhanced RS shown in FIG. 4, a base station assigns 1-4 PRBs (Physical Resource Block) and OCC [+1 +1] to UE1; and the base station assigns 1-7 PRBs, and OCC [+1 −1] to UE2. Although the frequency bands used by UE1 and UE2 are partly overlapped, the OCCs used by them are orthogonal to each other. As a result, the two RS symbols for the subframe are orthogonal to each other.

Additionally, the orthogonal code configuration information may also include two or more of the orthogonal code, the CS and the OCC. With an example where the orthogonal code configuration information includes specific CS and OCC used by a UE in generating RS, the mapping relation list may be as shown in the following Table 6.

TABLE 6

| RS solution information | orthogonal code configuration information | | hopping mode |
| --- | --- | --- | --- |
| | CS | OCC | |
| 000 | 0 | [+1 +1] | hopping mode 1 |
| 001 | 3 | [+1 +1] | hopping mode 2 |
| 010 | 6 | [+1 +1] | hopping mode 3 |
| 011 | 9 | [+1 +1] | hopping mode 4 |
| 100 | 1 | [+1 −1] | hopping mode 5 |
| 101 | 7 | [+1 −1] | hopping mode 6 |
| 110 | 4 | [+1 +1] | hopping mode 7 |
| 111 | 10 | [+1 +1] | hopping mode 8 |

It should be noted that the specific value of CS can be obtained by the equation $n_{cs}=(n_{DMRS}^{(1)}+n_{DMRS}^{(2)}+n_{PRS}(n_s))$ mod 12, wherein $n_{DMRS}^{(1)}$ means that the base station sends) signaling notice to the UE by broadcast; $n_{DMRS}^{(2)}$ means that the base station sends signaling notice to the UE by unicast; $n_{PRS}(n_s)$ is related to the cell ID; $n_s$ represents a slot number; $n_{PRS}(n_s)$ takes different values in different slots, namely the value of CS hops among different slots; mod represents a modulus operation. In this step, the value of CS which is included in the orthogonal code configuration information and used in generating RS by UE can only be represented by $n_{DMRS}^{(2)}$, and the embodiment does not set specific limitation on the value of CS.

As for the hopping mode, different hopping modes correspond to different hopping periods. The embodiment does not set limitation on the specific hopping mode, and also does not set limitation on the specific value of the hopping period corresponding to the hopping mode. In a specific application, the object of hopping can be the sequence group or the cyclic shift, then the hopping mode may be a sequence group hopping mode or a cyclic shift hopping mode.

The sequence group hopping mode means that the sequence group used by the UE in generating the RS hops among different times, and hopping result is related to the cell identifier where at different moments, different cells have different hopping results. Similar to the sequence group hopping mode, the cyclic shift hopping mode means that the cyclic shift used by the UE in generating the RS hops among different times, and the hopping result is related to the cell identifier, where at different moments, different cells have different hopping results.

The embodiment only uses the sequence group hopping under the scenario where a base station assigns a same frequency band to different UEs as an example to illustrate the hopping mode. As the schematic drawing of the principal of the sequence group hopping technique shown in FIG. 5, when the sequence group hopping technique is not used, it is supposed that the CAZAC sequence A(UE1), which is used by UE1 on the RS symbols in the first and the second slots, is a sequence in the first sequence group, and the CAZAC sequence A(UE3), which is used by UE3 on the RS symbols in the first and the second slots, is a sequence in the fifth sequence group. If mutual interference between the first and the fifth sequences is relatively high, the mutual interference between UE1 and UE3 on the first and the second RS symbols are both relatively high. As such, performance the signal, which was sent by the UEs, detected by the base station is relatively poor. As for the case where the sequence group hopping technique is used, it is supposed that the CAZAC sequences, which are used on the RS symbols by UE1 in the first and the second slots, are (A(UE1,Slot1)) and A(UE1, Slot2)) which correspond to the sequences in the first and the third sequence groups respectively, and the CAZAC sequences, which are used on the RS symbols by UE3 in the first and the second slots, are (A(UE3,Slot1)) and A(UE3, Slot2)) which correspond to the sequences in the fifth and the ninth sequence groups respectively. If mutual interference between the first and the fifth sequence groups is relatively high, and mutual interference between the third and the ninth groups is relatively low, then the mutual interference between UE1 and UE3 on the RS symbols in the first slot is relatively high, and the mutual interference between UE1 and UE3 on the RS symbols in the second slot is relatively low. The base stations of two cells can still detect their signals normally.

Figure 5:
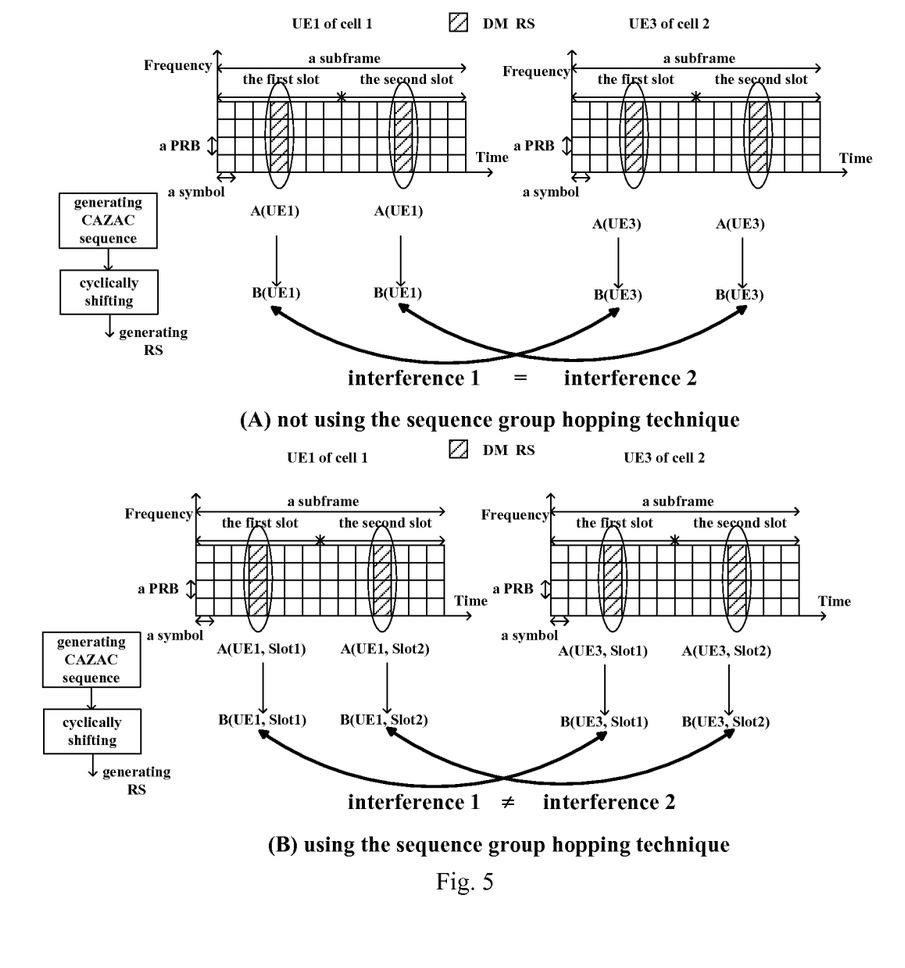
FIG. 5 is a schematic drawing of the principal of the hopping technique provided by the embodiment 3 of the present invention.

That is to say, in term of the interference among cells, with the sequence group hopping, since the sequence groups used by UEs of different cells in generating RS are not fixed and the interferences among the different sequence groups are different, the mutual interferences among UEs in different cells are randomized. The cyclic shift hopping mode can achieve the same effect, which will not be repeated redundantly herein.

Furthermore, the hopping mode can also be classified as slot-level hopping and subframe-level hopping.

For example, in the LTE-A (LTE-Advanced) system, an uplink subframe is 1ms long, which includes two slots, and each slot includes one RS symbol. If RS solution information, which is sent by a base station to a UE, indicates that the hopping mode corresponding to the RS solution information used by the UE is the slot-level hopping, then the RS symbols sent by the UE in the two slots of one subframe hop. If RS solution information, which is sent by a base station to a UE, indicates that the hopping mode corresponding to the RS solution information used by the UE is subframe-level hopping, then the RS symbols sent by the UE in the two slots of one subframe will not hop, but will hop between the subframes.

Different RS solutions corresponding to the slot-level hopping cannot support the orthogonality among UEs under the MU-MIMO (Multiple User-Multiple Input Multiple Output) scenario where different UEs are assigned partly overlapped frequency bands, and different RS solutions corresponding to the subframe-level hopping can support the orthogonality among UEs under the MU-MIMO scenario where different UEs are assigned partly overlapped frequency bands.

In either hopping mode, there is a corresponding hopping rule, and each hopping rule has corresponding hopping-rule related parameter(s). Part or all of the hopping rules and the hopping-rule related parameter(s) can be preset on UE side and base station side, and thus it will not be necessary for the base station to send to UE a signaling to notify the hopping rules and the hopping-rule related parameter(s) corresponding to the hopping mode. Accordingly, when UE generates reference signal according to the determined orthogonal code configuration information and the hopping mode, in particular, UE generates reference signal according to the stored hopping-rule related parameter(s), the hopping rule corresponding to the determined hopping mode and the determined orthogonal code configuration information.

The embodiment does not set limitation on the specific hopping rule, and the following two hopping rules are given as an example:

For example, hopping rule corresponding to the subframe-level hopping is $N_{ID}^{cell}$ mod 30 or $[N_{ID}^{cell}+\text{floor}(n_s/2)]$ mod 30, where $N_{ID}^{cell}$ represents cell ID; floor(•) represents rounding down to the nearest integer. In this way, as for the first and the second slots of the first subframe ($n_s$ are 0 and 1, respectively), the sequence group numbers used by two RS symbols are both equal to $N_{ID}^{cell}$ mod 30 (floor($n_s/2$) are both equal to 0).

For another example, the hopping rule corresponding to the slot-level sequence group hopping is $[(\Sigma_{i=0}^{7} c(8n_s+i) \cdot 2^i) \text{mod } 30 + (N_{ID}^{cell} \text{ mod } 30 + \Delta_{ss}) \text{mod } 30]$ mod 30, where c(•) represents a random sequence, $n_s$ represents a slot number, and $\Delta_{ss}$ represents an offset value.

Also, the embodiment does not set limitation on the specific hopping-rule parameter. With the hopping rule corresponding to the slot-level sequence group above as an example, specifically, the hopping-rule related parameter may be $\Delta_{ss}$.

Optionally, UE may not pre-store hopping-rule related parameter(s), and rather, base station provides UE with the hopping-rule related parameter(s) involved in some hopping rules. As a result, before the base station sends the reference signal solution information to the UE, a step of sending to the UE hopping-rule related parameter(s) may be further included, enabling the UE to generate reference signal according to the received hopping-rule related parameter(s), the hopping rule corresponding to the hopping mode and the orthogonal code configuration information. For example, with respect to the hopping rule corresponding to the subframe-level sequence group hopping described above, the base station sends to UE the value of the hopping-rule related parameter $\Delta_{ss}$ before sending to the UE a signaling carrying the reference signal solution information. As such, the UE can obtain the hopping rule of the sequence group hopping according to $\Delta_{ss}$.

Accordingly, when a UE generates a reference signal according to orthogonal code configuration information, specifically, the UE generates the reference signal according to the received hopping-rule related parameter(s), the hopping rule corresponding to the determined hopping mode and the determined orthogonal code configuration information.

304: the UE sends the generated reference signal to the base station.

Figure 6:
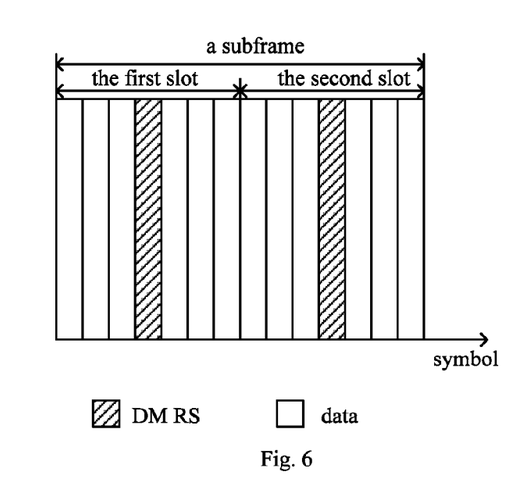
FIG. 6 is a schematic drawing of the structure of demodulating reference signal provided by the embodiment 3 of the present invention.

As for this step, as the schematic drawing of the structure of demodulating reference signal shown in FIG. 6, a subframe includes two slots, with 14 symbols totally. The UE transmits DM RS in the third and the eleventh symbols and transmits data in other symbols, so that the base station can obtain channel fading information by receiving the DM RS sent by the UE, thereby demodulating the data symbols.

Furthermore, the mapping relation among the RS solution information, orthogonal code configuration information and the hopping mode would be different if the number of the data stream(s), which are sent from the UE to the base station simultaneously, is different. The number of the data stream(s), which are sent from the UE to the base station simultaneously is named as a number of data transmission layer(s). Then in the step 301 described above, before the base station sends the signaling carrying the RS solution information, it is further comprised that the base station sends a signaling to the UE, which indicates the number of data transmission layer(s).

That is, there are many kinds of mapping relations pre-stored in UE and base station, and different numbers of data transmission layer(s) correspond to different mapping relations. When the number of data transmission layer(s) assigned by the base station is different, the mapping relation used by the UE (and the base station) is different. Then in the step 303 described above, when the UE determines, according to the received RS solution information and the stored mapping relations, the corresponding orthogonal code configuration information and the corresponding hopping mode, it needs to determine the corresponding mapping relation according to the number of data transmission layer(s) indicated by the base station, and to determine, according to the determined mapping relation, the orthogonal code configuration information and the hopping mode corresponding to the determined RS solution information.

For example, there are 4 mapping relation lists pre-stored by UE and base station, which correspond to the cases where the number of data transmission layer(s) indicated by the base station for the UE is 1, 2, 3, 4 respectively, which can support the UE in transmitting 4 layers of data streams at most. The mapping relations when the number of data transmission layer(s) is 1 to 4 are shown in the following Table 7 to Table 10, respectively.

TABLE 7

| reference signal solution information | orthogonal code configuration information | | hopping mode |
|---|---|---|---|
| | CS value | OCC value | |
| 000 | 0 | [+1 +1] | slot-level sequence group hopping |
| 001 | 3 | [+1 +1] | slot-level sequence group hopping |
| 010 | 6 | [+1 +1] | slot-level sequence group hopping |
| 011 | 9 | [+1 +1] | slot-level sequence group hopping |
| 100 | 1 | [+1 −1] | Subframe-level sequence group hopping |
| 101 | 7 | [+1 −1] | subframe-level sequence group hopping |
| 110 | 4 | [+1 +1] | subframe-level sequence group hopping |
| 111 | 10 | [+1 +1] | subframe-level sequence group hopping |

TABLE 8

| reference signal solution information | orthogonal code configuration information | | hopping mode |
|---|---|---|---|
| | CS value | OCC value | |
| 000 | 0, 6 | [+1 +1], [+1 +1] | slot-level sequence group hopping |
| 001 | 0, 6 | [+1 −1], [+1 −1] | slot-level sequence group hopping |
| 010 | 5, 11 | [+1 +1], [+1 +1] | slot-level sequence group hopping |
| 011 | 3, 9 | [+1 +1], [+1 +1] | slot-level sequence group hopping |
| 100 | 1, 7 | [+1 +1], [+1 +1] | subframe-level sequence group hopping |
| 101 | 1, 7 | [+1 −1], [+1 −1] | subframe-level sequence group hopping |
| 110 | 3, 9 | [+1 −1], [+1 −1] | subframe-level sequence group hopping |
| 111 | 5, 11 | [+1 −1], [+1 −1] | subframe-level sequence group hopping |

TABLE 9

| reference signal solution information | orthogonal code configuration information | | hopping mode |
|---|---|---|---|
| | CS value | OCC value | CS value |
| 000 | 0, 4, 8 | [+1 −1], [+1 −1], [+1 −1] | slot-level sequence group hopping |
| 001 | 1, 5, 9 | [+1 +1], [+1 +1], [+1 +1] | slot-level sequence group hopping |
| 010 | 2, 6, 10 | [+1 −1], [+1 −1], [+1 −1] | slot-level sequence group hopping |
| 011 | 0, 4, 8 | [+1 +1], [+1 +1], [+1 +1] | slot-level sequence group hopping |
| 100 | 1, 5, 9 | [+1 −1], [+1 −1], [+1 −1] | subframe-level sequence group hopping |
| 101 | 0, 4, 8 | [+1 +1], [+1 +1], [+1 +1] | subframe-level sequence group hopping |
| 110 | 3, 7, 11 | [+1 −1], [+1 −1], [+1 −1] | subframe-level sequence group hopping |
| 111 | 3, 7, 11 | [+1 +1], [+1 +1], [+1 +1] | subframe-level sequence group hopping |

TABLE 10

| reference signal solution information | orthogonal code configuration information | | hopping mode |
|---|---|---|---|
| | CS value | OCC value | CS value |
| 000 | 0, 3, 6, 9 | [+1 −1], [+1 −1], [+1 −1], [+1 −1] | slot-level sequence group hopping |
| 001 | 1, 4, 7, 10 | [+1 +1], [+1 +1], [+1 +1], [+1 +1] | slot-level sequence group hopping |
| 010 | 2, 5, 8, 11 | [+1 −1], [+1 −1], [+1 −1], [+1 −1] | slot-level sequence group hopping |
| 011 | 0, 3, 6, 9 | [+1 +1], [+1 +1], [+1 +1], [+1 +1] | slot-level sequence group hopping |
| 100 | 1, 4, 7, 10 | [+1 −1], [+1 −1], [+1 −1], [+1 −1] | subframe-level sequence group hopping |
| 101 | 2, 5, 8, 11 | [+1 +1], [+1 +1], [+1 +1], [+1 +1] | subframe-level sequence group hopping |

When the number of data transmission layer of a UE indicated by a base station is 1, the mapping relation corresponding to the number 1 of data transmission layer is shown in Table 7. With the signaling carrying the RS solution information, sent by the base station to the UE, is 100 as an example, the UE can determine, according to 100, that the value of CS is 1 and the value of OCC is [+1 −1], and adopts the subframe-level sequence group hopping.

When the number of data transmission layers of a UE indicated by a base station is 2, the mapping relation corresponding to the number 2 of data transmission layers is shown in Table 8. With the signaling carrying the RS solution information, sent by the base station to the UE, is 100 as an example, the UE can determine, according to 100, that the values of CS are 1, 7 and the values of OCC are [+1 +1], [+1+1] in the two data transmission layers, respectively, and adopts the subframe-level sequence group hopping.

When the number of data transmission layers of a UE indicated by a base station is 3, the mapping relation corresponding to the number of data transmission layers is shown in Table 9. With the signaling carrying the RS solution information, sent by the base station to UE, is 100 as an example, UE can determine, according to 100, that the values of CS are 1, 5 and 9 and the values of OCC are [+1 −1], [+1 −1] and [+1 −1] in the three data transmission layers, respectively, and adopts the subframe-level sequence group hopping.

When the number of data transmission layers of a UE indicated by a base station is 4, the mapping relation corresponding to the number of data transmission layers is shown in Table 10. With the signaling carrying the RS solution information, sent by the base station to UE, is 100 as an example, UE can determine, according to 100, that the values of CS are 1, 4, 7 and 10 and the values of OCC are [+1 −1], [+1 −1], [+1 −1] and [+1 −1] in the four data transmission layers, respectively, and adopts the subframe-level sequence group hopping.

It can be seen from the analysis above and tables 7 to 10 described above that, in the mapping relation tables pre-stored by UE and base station, different layers of the data transmission layers correspond to a same value of OCC, which facilitates to assign different values of OCC to different UEs.

As shown in Table 10, when the signaling sent by a base station to UE1 is 100, values of OCC used by RS symbols corresponding to different numbers of data transmission layer(s) are the same, namely [+1 −1]. When the signaling sent by a base station to UE2 is 101, values of OCC used by RS symbols corresponding to different numbers of data transmission layer(s) are the same, namely [+1 +1]. Then the base station can assign the first to fourth PRBs to UE1 and the first to seventh PRBs to UE2. Since UE1 and UE2 adopt different values of OCC and adopt the subframe-level sequence group hopping both, the RS symbols generated by UE1 and UE2 are orthogonal to each other.

Next, in connection with different application scenarios, a detailed description of the method for generating reference signal provided by the embodiment will be given.

As for single user scenario:

A base station can assign a certain frequency band to one UE, and sends to the UE a signaling carrying RS solution information. After receiving it, the UE can obtain the orthogonal code information and the hopping mode corresponding to the RS solution information sent from the base station to the UE, thereby generate and send RS symbol to the base station. At this time, the UE will not be interfered by other UEs in the current cell.

For example, the base station sends a signaling to the UE to indicate the number 1 of data transmission layer and the signaling of RS sent to the UE is 100. Then it can be known from the mapping relation Table 7 corresponding to the above data transmission layer 1 that the UE uses a value of CS being 1 and a value of OCC being [+1 −1] and adopts the subframe-level sequence group hopping.

As for MU-MIMO scenario supporting assignment of a same frequency band:

A base station may only assign a same frequency band to multiple UEs, and sends signalings to different UEs, which carry RS solution information, and the RS solution information received by the respective UEs are different. Then, after receiving corresponding signalings respectively, each UE will obtain orthogonal code configuration information and hopping mode corresponding to the respective assigned RS solution information, thereby generating and sending RS symbols to the base station. At this time, the RS symbols generated by different UEs are orthogonal to each other.

For example, a base station assigns the first to fourth PRBs to both of UE1 and UE2. The base station sends to UE1 a signaling to indicate that the number of data transmission layer is 1 and sends to UE1 a signaling of RS 000. Then, it can be obtained from the mapping relation table 7 described above corresponding to the data transmission layer 1 that UE 1 uses a value of CS being 0 and a value of OCC being [+1 +1], and adopts the slot-level sequence group hopping. The base station sends to UE2 a signaling to indicate that the number of data transmission layer is 1 and sends to UE2 a signaling of RS 010. Then, it can be obtained from the mapping relation table 7 described above corresponding to the data transmission layer 1 that UE2 uses a value of CS being 6 and a value of OCC being [+1 +1], and adopts the slot-level sequence group hopping. Since different values of CS are adopted, the RS symbols generated by UE1 and UE2 are orthogonal to each other.

As for MU-MIMO scenarios supporting assignment of different frequency bands:

A base station may merely assign partly overlapped frequency bands to multiple UEs, and sends corresponding RS solution information to different UEs, enabling each UE to obtain the orthogonal code configuration information and the hopping mode corresponding to the RS solution information assigned by the base station, and enabling each UE to generate and send RS symbol to the base station. At this time, each UE will not be interfered by other UEs in the current cell.

For example, a base station assigns the first to the fourth PRBs to UE1 and assigns the first to the seventh PRBs to UE2. The base station sends to UE1 a signaling to indicate that the number of data transmission layers is 2 and sends to UE1 a signaling of RS 100. Then, it can be obtained from the mapping relation Table 8 described above corresponding to the data transmission layer 2, that UE1 uses values of CS being 1 and 7 and values of OCC being [+1 +1] and [+1 +1], and adopts the subframe-level sequence group hopping. The base station sends to UE2 a signaling to indicate that the number of data transmission layers is 2 and sends to UE2 a signaling of RS 101. Then, it can be obtained from the mapping relation Table 8 described above corresponding to the data transmission layer 2 that UE2 uses values of CS being 1 and 7 and values of OCC being [+1 +1] and [+1 −1], and adopts the subframe-level sequence group hopping. Although UE1 and UE2 send signalings on a partly overlapped frequency bands, the RS symbols generated by UE1 and UE2 are orthogonal to each other because they adopt different values of OCC, and both adopt subframe-level sequence group hopping.

The method provided by the embodiment delivers hopping mode without increasing system signaling overhead, through pre-storing mapping relations among reference signal solution information, orthogonal code configuration information and hopping mode on a base station and a user equipment and the user equipment generating reference signal after determining the corresponding orthogonal code configuration information and the corresponding hopping mode according to the reference signal solution information sent by the base station, so that the UE's hopping mode fits the scenario where the UE is, to ensure the orthogonality of reference signals generated by different UEs in various scenarios.

Embodiment 4

Figure 7:
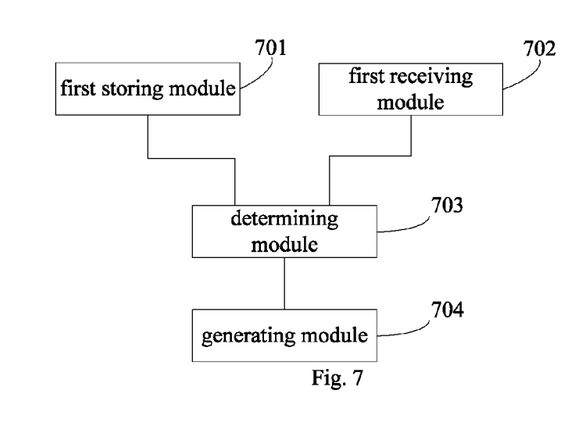
FIG. 7 is a schematic drawing of the structure of a first user equipment provided by embodiment 4 of the present invention.

Referring to FIG. 7, the embodiment provides a user equipment, the user equipment comprising a first storing module 701 configured to store at least one mapping relation among reference signal solution information, orthogonal code configuration information and a hopping mode;

a first receiving module 702 configured to receive a signaling carrying the reference signal solution information sent by a base station; and;

a determining module 703 configured to determine, according to the reference signal solution information received by the first receiving module 702 and the at least one mapping relation stored by the first storing module 701, corresponding orthogonal code configuration information and a corresponding hopping mode; and a generating module 704 configured to generate a reference signal according to the orthogonal code configuration information and the hopping mode determined by the determining module 703.

Figure 8:
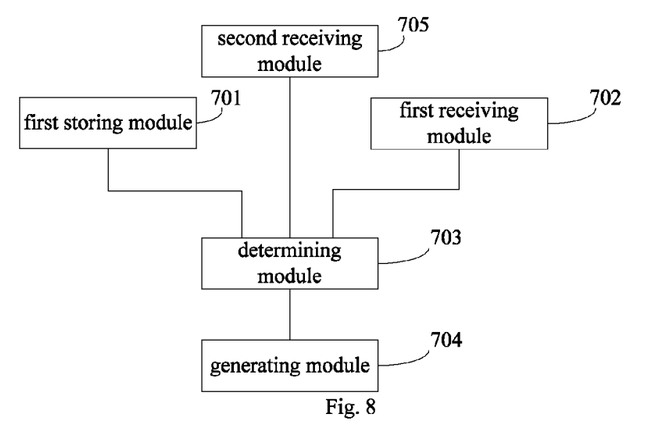
FIG. 8 is a schematic drawing of the structure of a second user equipment provided by the embodiment 4 of the present invention.

Furthermore, referring to FIG. 8, the user equipment further comprises a second receiving module 705 configured to receive a signaling indicating the number of data transmission layer(s) sent by the base station.

Accordingly, the determining module 703 determines a corresponding mapping relation from the at least one mapping relation stored by the first storing module 701 according to the number of data transmission layer(s) indicated by the signaling received by the second receiving module 705, and determines the orthogonal code configuration information and the hopping mode corresponding to the reference signal solution information according to the corresponding mapping relation.

Figure 9:
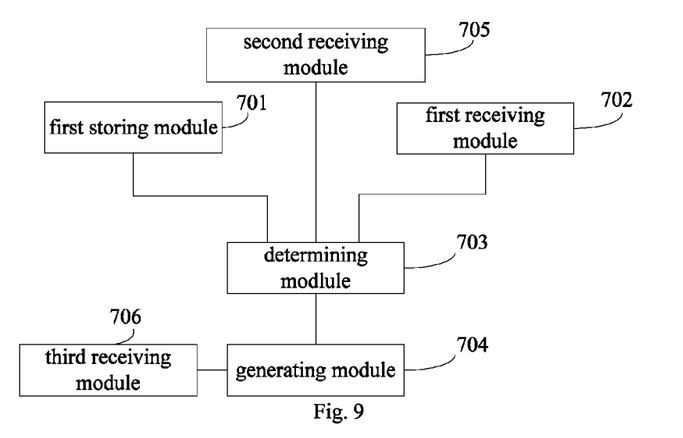
FIG. 9 is a schematic drawing of the structure of a third user equipment provided by the embodiment 4 of the present invention.

Optionally, referring to FIG. 9, the user equipment further comprises a third receiving module 706 configured to receive a hopping-rule parameter sent by the base station.

Accordingly, the generating module 704 is further configured to generate the reference signal according to the hopping-rule relevant parameter received by the third receiving module 706, a hopping rule corresponding to the hopping mode determined by the determining module 703 and the orthogonal code configuration information determined by the determining module 703.

Figure 10:
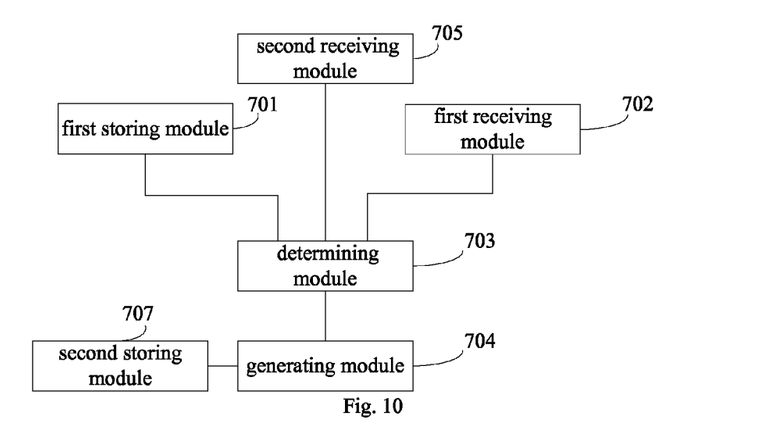
FIG. 10 is a schematic drawing of the structure of a fourth user equipment provided by the embodiment 4 of the present invention.

Optionally, referring to FIG. 10, the user equipment further comprises a second storing module 707 configured to pre-store a hopping-rule relevant parameter.

The generating module 704 is further configured to generate the reference signal according to the hopping-rule relevant parameter stored by the second storing module 707, a hopping rule corresponding to the hopping mode determined by the determining module 703 and the orthogonal code configuration information determined by the determining module 703.

In conclusion, the user equipment provided by the embodiment delivers hopping mode without increasing system signaling overhead, through pre-storing mapping relations among reference signal solution information, orthogonal code configuration information and hopping mode, and generating reference signal after determining a corresponding orthogonal code configuration information and hopping mode according to the reference signal solution information sent by the base station, so that the UE's hopping mode fits the scenario where the UE is, to ensure the orthogonality of reference signals generated by different UEs in various scenarios.

Embodiment 5

Figure 11:
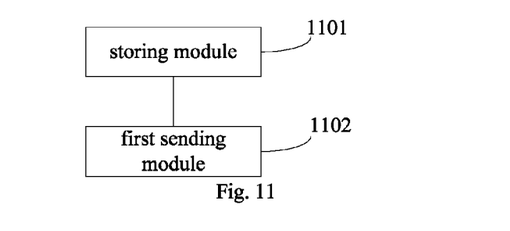
FIG. 11 is a schematic drawing of the structure of a first base station provided by embodiment 5 of the present invention.

Referring to FIG. 11, the embodiment provides a base station, the base station comprising a storing module 1101 configured to store at least one mapping relation among reference signal solution information, orthogonal code configuration information and hopping mode; and a first sending module 1102 configured to send a signaling, carrying reference signal solution information, to the user equipment, enabling the user equipment to determine corresponding orthogonal code configuration information and a corresponding hopping mode according to the reference signal solution information and the at least one mapping relation among the reference signal solution information, the orthogonal code configuration information and the hopping mode, pre-stored by the user equipment, and generate a reference signal according to the determined orthogonal code configuration information and the determined hopping mode.

The mapping relations stored in the storing module 1101 vary with the number of data transmission layer(s).

Figure 12:
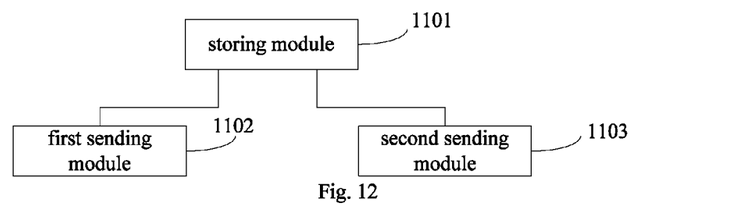
FIG. 12 is a schematic drawing of the structure of a second base station provided by the embodiment 5 of the present invention.

Furthermore, referring to FIG. 12, the base station further comprises a second sending module 1103 configured to send a signaling indicating a number of data transmission layer(s) to the user equipment, enabling the user equipment to determine the corresponding mapping relation according to the indicated number of the data transmission layer(s).

Figure 13:
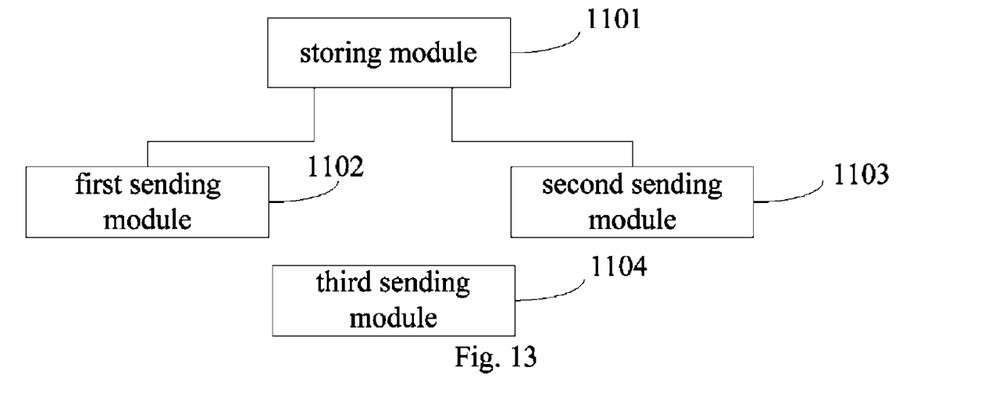
FIG. 13 is a schematic drawing of the structure of a third base station provided by the embodiment 5 of the present invention.

Optionally, referring to FIG. 13, the base station further comprises a third sending module 1104 configured to sending a hopping-rule relevant parameter to the user equipment, enabling the user equipment to generate the reference signal according to the hopping-rule relevant parameter, a hopping rule corresponding to the hopping mode and the orthogonal code configuration information.

The base station provided by the embodiment delivers hopping mode without increasing system signaling overhead, through pre-storing mapping relations among reference signal solution information, orthogonal code configuration information and hopping mode and sending to the user equipment the signaling carrying the reference signal solution information, enabling the user equipment to generate reference signal after determining the corresponding orthogonal code configuration information and the corresponding hopping mode according to the reference signal solution information, so that the UE's hopping mode fits the scenario where the UE is, to ensure the orthogonality of reference signals generated by different UEs in various scenarios.

Embodiment 6

Figure 14:
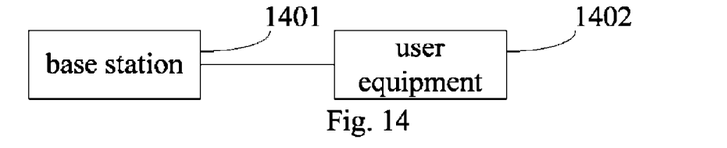
FIG. 14 is a schematic drawing of the structure of system for generating reference signals provided by embodiment 6 of the present invention.

Referring to FIG. 14, the embodiment provides a system for generating reference signal, and the system comprises a base station 1401 and a user equipment 1402.

The base station 1401 is as the base station provided in the embodiment 5 described above, and the user equipment is as the user equipment provided in the embodiment 4 described above. This embodiment will not repeat redundantly herein.

The system for generating reference signal provided by the embodiment delivers hopping mode without increasing system signaling overhead, through the base station and the user equipment pre-storing mapping relations among reference signal solution information, orthogonal code configuration information and hopping mode and the user equipment generating reference signal after determining the corresponding orthogonal code configuration information and the corresponding hopping mode according to the reference signal solution information sent by the base station, so that the UE's hopping mode fits the scenario where the UE is, to ensure the orthogonality of reference signals generated by different UEs in various scenarios.

It should be noted that it is only exemplified with the division of the respective functional modules as described above when the user equipment provided by the embodiments described above generates reference signals, and in actual practice, the functions mentioned above can be assigned to be performed by different functional modules as needed, namely the internal structure of the devices is divided into different functional modules in order to perform all or part of the functions described above. In addition, the user equipment, the base station and the system for generating reference signal provided by the embodiments above belong to the same concept as the embodiments of method for generating reference signal, and the specific implementations thereof may refer to the method embodiments in detail which will not be repeated redundantly herein.

The sequence numbers of the embodiments of the present invention described above are merely for description, which do not represent merits or defects of the embodiments.

All or some of the steps of the embodiments of the present invention may be realized with software and corresponding software program may be stored in a readable storage medium, such as optical disk, hard disk or the like.

The above description is only preferable embodiments of the present invention, which is not meant to limit the present invention. Any amendments, equivalent substitutions and improvements under the spirit and principal of the present invention shall be included in the protection scope of the present invention.

What is claimed is:

1. A method for generating a reference signal, comprising:
   receiving, by a user equipment from a base station, a first signal carrying reference signal solution information, wherein the reference signal solution information has at least one mapping relation with at least one piece of orthogonal code configuration information and at least one hopping mode, wherein the at least one mapping relation is stored at the base station and at the user equipment;
   determining, by the user equipment, a corresponding piece of the orthogonal code configuration information and a corresponding hopping mode according to the received reference signal solution information and the stored at least one mapping relation; and
   generating, by the user equipment, a reference signal according to the determined piece of the orthogonal code configuration information and the determined hopping mode,
   wherein before receiving, by the user equipment, the first signal, the method further comprises:
   receiving, by the user equipment from the base station, a second signal indicating a quantity of data transmission layers; and
   wherein the determining, by the user equipment, the corresponding piece of the orthogonal code configuration information and the corresponding hopping mode according to the received reference signal solution information and the stored at least one mapping relation comprises:
   determining, by the user equipment, at least one corresponding mapping relation from the stored at least one mapping relation according to the quantity of data transmission layers; and
   determining, by the user equipment, the corresponding piece of the orthogonal code configuration information and the corresponding hopping mode according to the reference signal solution information and the at least one determined corresponding mapping relation determined according to the quantity of data transmission layers,
   wherein different data transmission layers use a single orthogonal cover code when the orthogonal code configuration information includes the orthogonal cover code.

2. The method of claim 1, wherein before receiving, by the user equipment, the first signal, the method further comprises:
   receiving, by the user equipment from the base station, a hopping-rule relevant parameter; and
   wherein the generating, by the user equipment, the reference signal according to the determined piece of the orthogonal code configuration information and the determined hopping mode comprises:
   generating, by the user equipment, the reference signal according to the hopping-rule relevant parameter, a hopping rule corresponding to the hopping mode, and the piece of the orthogonal code configuration information.

3. The method of claim 1, wherein before receiving, by the user equipment, the first signal, the method further comprises:
   storing a hopping-rule relevant parameter; and
   wherein the generating, by the user equipment, the reference signal according to the determined piece of the orthogonal code configuration information and the determined hopping mode comprises:
   generating, by the user equipment, the reference signal according to the hopping-rule relevant parameter, a hopping rule corresponding to the determined hopping mode, and the determined piece of orthogonal code configuration information.

4. The method of claim 1, wherein the reference signal solution information is sent by the base station through a channel for delivering relevant information on uplink scheduling.

5. The method of claim 1, wherein the orthogonal code configuration information comprises one of a group consisting of: an orthogonal code, a cyclic shift, and an orthogonal cover code.

6. The method of claim 1, wherein different hopping modes correspond to different hopping periods.

7. The method of claim 1, wherein the hopping mode comprises one of a group consisting of: a sequence group hopping mode and a cyclic shift hopping mode.

8. The method of claim 1, wherein the hopping mode comprises one of a group consisting of: a slot-level hopping mode and a subframe-level hopping mode.

9. A user equipment, comprising:
   a memory, configured to store at least one mapping relation among at least one piece of reference signal solution information, at least one piece of orthogonal code configuration information, and at least one hopping mode;
   a receiver, configured to receive a signal carrying a piece of reference signal solution information sent by a base station;
   a processor, configured to determine a corresponding piece of the orthogonal code configuration information and a corresponding hopping mode according to the received piece of reference signal solution information and the stored at least one mapping relation; and
   a generator, configured to generate a reference signal according to the determined piece of the orthogonal code configuration information and the hopping mode,
   wherein the receiver is further configured to receive a second signal indicating a quantity of data transmission layers sent by the base station,
   wherein the processor is further configured to determine at least one corresponding mapping relation from the at least one mapping relation stored by the memory according to the quantity of the data transmission layers indicated by the second signal and determine the corresponding piece of the orthogonal code configuration information and the corresponding hopping mode according to the received reference signal solution information and the at least one determined corresponding mapping relation,
   wherein different data transmission layers use a single orthogonal cover code when the orthogonal code configuration information includes the orthogonal cover code.

10. The user equipment of claim 9, wherein the receiver is further configured to receive a hopping-rule relevant parameter sent by the base station, and
    wherein the generator is further configured to generate the reference signal according to the received hopping-rule relevant parameter, a hopping rule corresponding to the determined hopping mode, and the determined piece of the orthogonal code configuration information.

11. The user equipment of claim 9, wherein
    the memory is further configured to store a hopping-rule relevant parameter,
    wherein the generator is further configured to generate the reference signal according to the stored hopping-rule relevant parameter, a hopping rule corresponding to the determined hopping mode and the determined piece of the orthogonal code configuration information.

12. A method for generating a reference signal, comprising:

storing, by a base station, at least one mapping relation among at least one piece of reference signal solution information, at least one piece of orthogonal code configuration information, and at least one hopping mode; and sending, by the base station, a first signal carrying a piece of reference signal solution information of the at least one piece of reference signal solution information to a user equipment to enable the user equipment to determine a corresponding piece of the orthogonal code configuration information and a corresponding hopping mode according to the reference signal solution information sent by the base station and at least one corresponding mapping relation from the at least one mapping relation stored by the user equipment, and to generate the reference signal according to the determined piece of the orthogonal code configuration information and the determined hopping mode, wherein before sending by the base station the first signal the method further comprises:

sending by the base station a second signal indicating a quantity of data transmission layers to the user to enable the user equipment to determine the at least one corresponding mapping relation from the at least one mapping relation stored in the user equipment according to the indicated quantity of the data transmission layers, wherein different data transmission layers use a single orthogonal cover code when the orthogonal code configuration information includes the orthogonal cover code.

13. The method of claim 12, wherein before sending, by the base station, the first signal, the method further comprises:

sending, by the base station, a hopping-rule relevant parameter to the user equipment, to enable the user equipment to generate the reference signal according to the hopping-rule relevant parameter, a hopping rule corresponding to the determined hopping mode, and the determined piece of the orthogonal configuration solution information.

14. A base station, comprising:

a memory, configured to store at least one mapping relation among at least one piece of reference signal solution information, at least one piece of orthogonal code configuration information, and at least one hopping mode; and a transmitter, configured to send a first signal carrying a piece of reference signal solution information of the at least one piece of reference signal solution information, to a user equipment to enable the user equipment to determine a corresponding piece of the orthogonal code configuration information and a corresponding hopping mode according to the reference signal solution information sent by the base station and at least one corresponding mapping relation from the at least one mapping relation stored by the user equipment, and to generate a reference signal according to the determined piece of the orthogonal code configuration information and the determined hopping mode, wherein the transmitter is further configured to send a second signal indicating a quantity of data transmission layers to the user equipment to enable the user equipment to determine the at least one corresponding mapping relation from the at least one mapping relation stored in the user equipment according to the indicated quantity of the data transmission layers, wherein different data transmission layers use a single orthogonal cover code when the orthogonal code configuration information includes the orthogonal cover code.

15. The base station of claim 14, wherein the transmitter is further configured to send a hopping-rule relevant parameter to the user equipment to enable the user equipment to generate the reference signal according to the hopping-rule relevant parameter, a hopping rule corresponding to the determined hopping mode, and the determined piece of the orthogonal code configuration information.

* * * * *